United States Patent [19]

Smithkey

[11] Patent Number: 4,580,612

[45] Date of Patent: Apr. 8, 1986

[54] DEVICE FOR MOUNTING AND DEMOUNTING HEAVY EQUIPMENT TIRES FROM MULTI-PIECE WHEEL RIMS

[75] Inventor: James E. Smithkey, North Canton, Ohio

[73] Assignee: Motor Wheel Corporation, Lansing, Mich.

[21] Appl. No.: 646,127

[22] Filed: Aug. 31, 1984

[51] Int. Cl.$^4$ .............................................. B60C 25/06
[52] U.S. Cl. ..................................................... 157/1.2
[58] Field of Search .......................... 157/1.17, 1.2, 1.26

[56] References Cited

U.S. PATENT DOCUMENTS

| | | | |
|---|---|---|---|
| 950,212 | 2/1910 | Schlosser et al. | 72/218 |
| 1,170,612 | 2/1916 | Covey | 157/1.2 |
| 1,528,694 | 3/1925 | Riley | 72/218 |
| 1,762,234 | 6/1930 | Matthews | 72/218 |
| 1,890,746 | 12/1932 | O'Dell | 157/1.2 |
| 2,580,926 | 1/1952 | Johnson et al. | 157/1.2 |
| 2,792,878 | 5/1957 | Sanford | 157/1.2 |
| 3,685,335 | 8/1972 | Kowal | 72/218 |
| 4,079,769 | 3/1978 | Sept, Sr. | 157/1.26 |
| 4,155,239 | 5/1979 | Fjallstrom et al. | 72/218 |

FOREIGN PATENT DOCUMENTS

| | | | |
|---|---|---|---|
| 547995 | 9/1956 | Italy | 157/1.26 |
| 2098110 | 3/1982 | United Kingdom | 72/218 |

*Primary Examiner*—James G. Smith
*Attorney, Agent, or Firm*—Barnes, Kisselle, Raisch, Choate, Whittemore & Hulbert

[57] ABSTRACT

A tool for mounting and demounting of large tires from associated multi-piece wheel rims. The tool includes upper and lower tubular arms each having a length adapted to span the diameter of a demountable tire retaining flange of the wheel rim while oriented perpendicular to the axis of the wheel and tire assembly. Each arm has pusher plates dependent therefrom adapted to engage the outer periphery of the tire bead retaining flange. The arms are connected by a pivot bolt so that the same can pivot relative to one another about the axis of the wheel assembly and are lockable in a given transverse crossing orientation. A pair of hold down bolts are carried on each arm spaced from one another to correspond with the diameter of the wheel disc mounting bolt hole pattern for insertion of the bolts through diametrically-opposed pairs of wheel mounting bolt holes. A pair of mounting plates are threadably received individually, one on each of the hold down bolts adapted to engage the underside of the wheel disc upon tightening of the associated hold down bolt.

6 Claims, 17 Drawing Figures

DEVICE FOR MOUNTING AND DEMOUNTING HEAVY EQUIPMENT TIRES FROM MULTI-PIECE WHEEL RIMS

The present invention is related to tire mounting and dismounting devices and, more particularly, is directed towards apparatus for mounting and dismounting large, usually off-highway, tires onto and off of their respective multi-piece rim.

Tires and rims are manufactured in many different sizes for utilization with many different types of vehicles. The larger the size of the tire, the more difficult it becomes for a single individual to safely mount and dismount the tire to or from its associated rim.

For those off-highway tires in the 15 to 25 inch diameter range, such as are commonly utilized for tractors, heavy trucks, construction vehicles, military and mining vehicles, mounting and dismounting at on-site or remote areas must often be accomplished without the benefit of fancy equipment. Such vehicles in use today customarily employ multi-piece rims for mounting pneumatic tires. This is particularly true where large size tires are employed. Typically, a multiple piece rim will include a main rim part having an upturned flange at one end for abutting the bead of a tire. The construction also includes a so-called "bead seat band/ring" or "flange ring" having a similar upturned flange and adapted to fit concentrically about the main rim. In addition, a sealing O-ring is generally located between the interface of the bead seat ring or flange ring and the main rim to preclude air leakage when tubeless tires are employed. Lastly, a split retaining ring or lock ring is employed to hold the bead seat ring or flange ring on the main rim under the substantial pressures applied when the tire is inflated.

In one exemplary technique for manually mounting such tires, the tire is initially placed about the rim base while lying on its side. The demountable bead seat ring or side flange is then placed over the rim base and is manually pushed straight down as far as possible. Then the installer stands on the side flange to force it below both grooves in the rim base. With the side flange and the installer thus positioned, the sealing ring must then be manually inserted into the lower sealing ring groove in the rim base. After the sealing ring is in place, in the case of tubeless tires, a snap lock ring must then be placed in the upper lock ring groove, an operation which also requires the flange to be held down below the groove exposure by having the installer stand on the tire's sidewall and/or flange. After ensuring, insofar as possible, that the lock ring fits snugly against the rim base around the entire circumference of the rim, the tire is then inflated by the installer. Upon inflation, the side flange will rise over the sealing ring and out against the lock ring.

The lock ring must be properly seated before the tire is inflated. Otherwise, upon inflation, the lock ring may snap loose off the rim.

Further, when one attempts to follow such instructions to manually mount tires in the 24 to 25 inch diameter category, which are common on many large pieces of earth moving machinery, one generally faces many strenuous hours of labor in attempting to manually hold down the side flange and side wall of the tire while installing the split lock ring and sealing ring. It often requires two and perhaps three individuals to facilitate installation. Unfortunately, the tools presently available which permit one person to mount such large intermediate size tires are relatively expensive and/or cumbersome in construction and use. Moreover, it is often simply too impractical and costly to ship such tires and rims back to a central garage or tire handling facility where large tire mounting and dismounting equipment might be available.

It may therefore be appreciated that a need exists for a versatile, simple, economical and safe tool which permits a single individual to on-site mount and dismount large diameter tires onto and off of their associated multipiece or split rims.

Prior art U.S. patents which illustrate exemplary tire handling devices in this general art area include U.S. Pat. Nos. 1,239,454; 1,729,861; 2,436,003; 2,512,864; 2,972,375; 3,500,891; 3,743,000; 3,747,661; 3,850,221; 4,079,769; 4,425,954 and U.S. Pat. No. 4,462,451, assigned to the assignee herein. However, none of the devices described in the cited patents suggest the invention concept to be detailed hereinbelow.

It is therefore a primary object of the present invention to provide an improved apparatus which permits a single individual to mount and dismount large tires onto and off of their associated multi-piece rims and which overcomes the disadvantages noted above with respect to prior art techniques.

Another object of the present invention is to provide improved apparatus for mounting and dismounting large tires which may be safely utilized by a single individual, and which is simple in operation and construction, and is therefore durable and amendable to inexpensive manufacture and production.

A further object of the present invention is to provide improved apparatus for mounting and dismounting large tires which enables a wide range of wheel bolt circle patterns to be accommodated.

A still additional object of the present invention is to provide a large tire mounting device which is portable and therefore may be easily transported to and utilized in remote areas.

Another object of this invention is to provide an apparatus which is chiefly intended to facilitate the mounting of large tires to their rims, but which also may be utilized in a demounting procedure, and is especially useful in such demounting procedures where rust scale has accumulated on the rim parts to impede ordinary breaking down of the tire by conventional implements.

Other objects, features and advantages of the present invention will become apparent from the following detailed description and accompanying drawings wherein.

Figure 3:
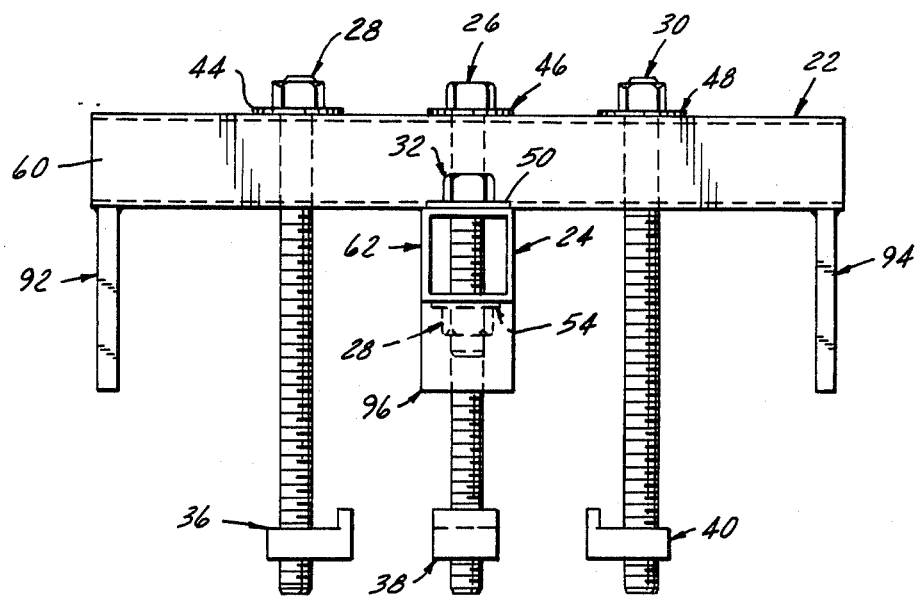
FIG. 3 is a vertical elevational view of the tire mounting tool of FIG. 1 shown by itself, this view being drawn to scale.
Figure 4:
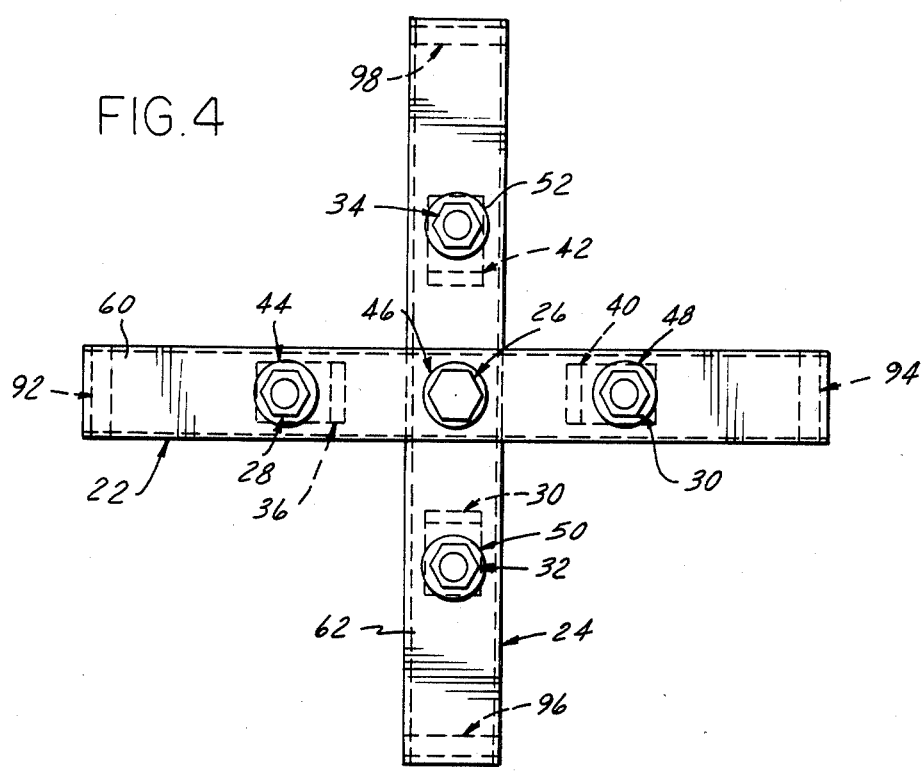
FIG. 4 is a scaled top plan view of the tool shown in FIG. 3.
Figure 5:
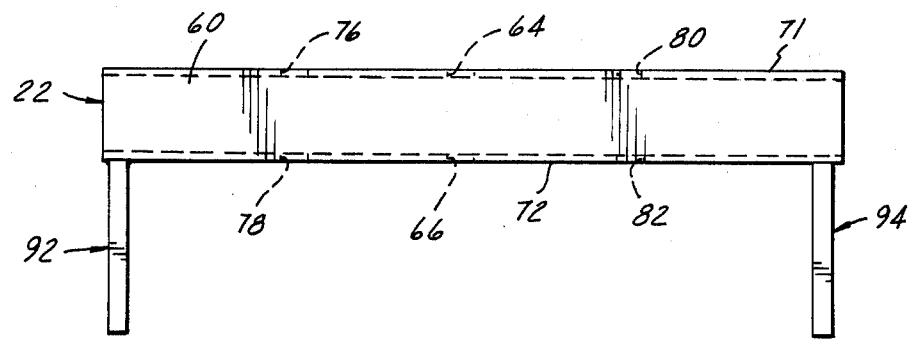
FIGS. 5 and 6 are scaled elevational and top plan views respectively of the upper arm of the tool of FIGS. 3 and 4 shown by itself.
Figure 6:
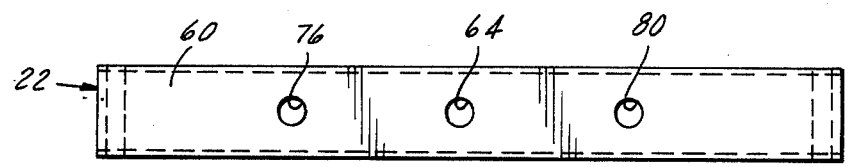
Figure 7:
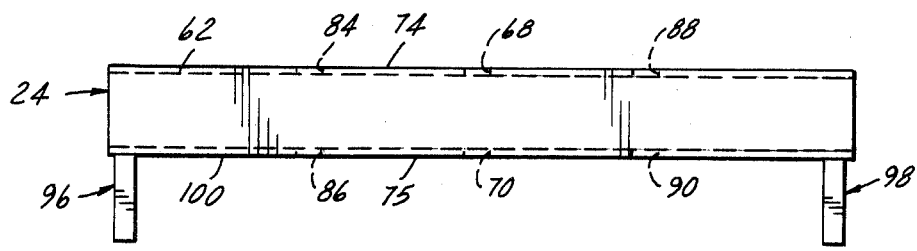
FIGS. 7 and 8 are scaled elevational and top plan views respectively of the lower arm of the tool of FIGS. 3 and 4 shown by itself.
Figure 8:
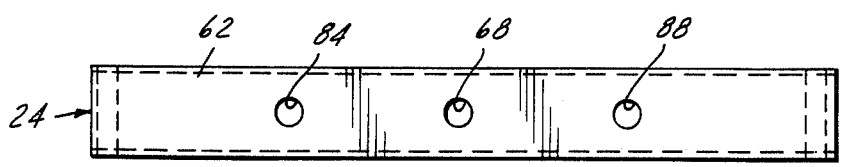
Figure 9:
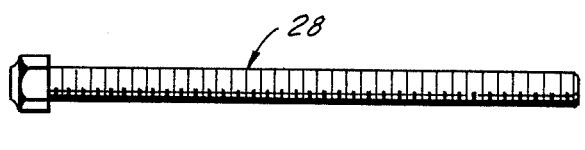

FIGS. 9 and scaled elevational views of the upper and lower arm draw bolts respectively of the tool of FIGS. 3 and 4 shown by themselves.

Figure 11:
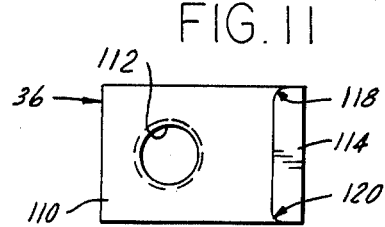
Figure 10:
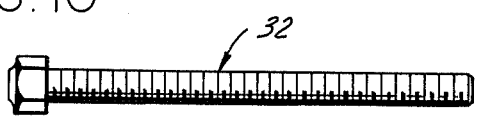
Figure 12:
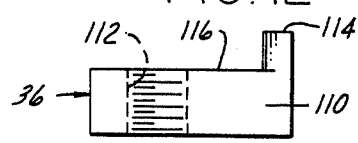
Figure 13:
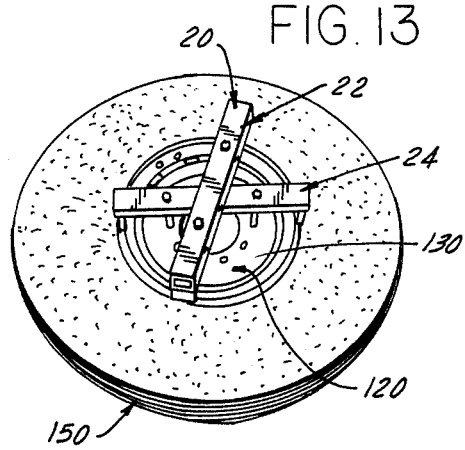
Figure 14:
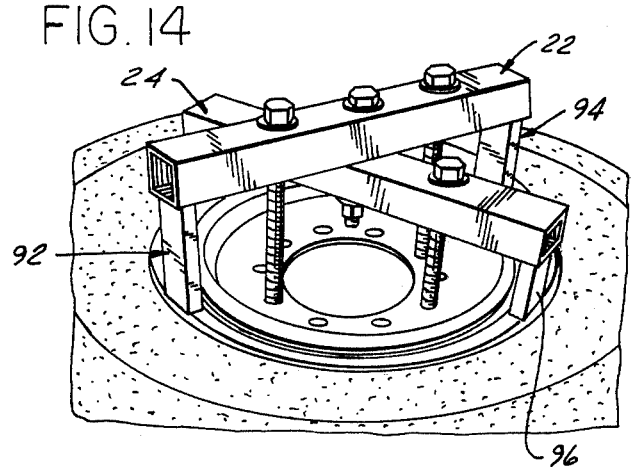
Figure 15:
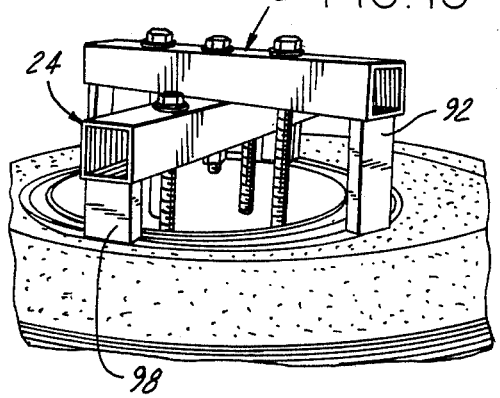
Figure 16:
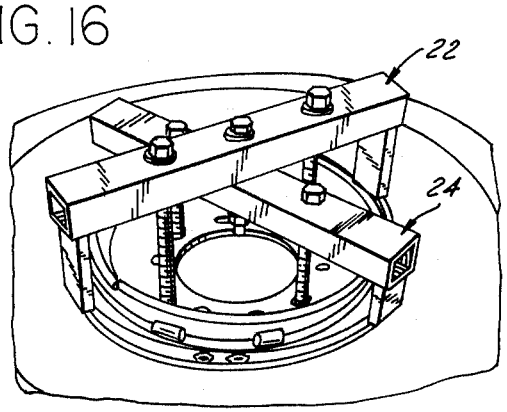
Figure 17:
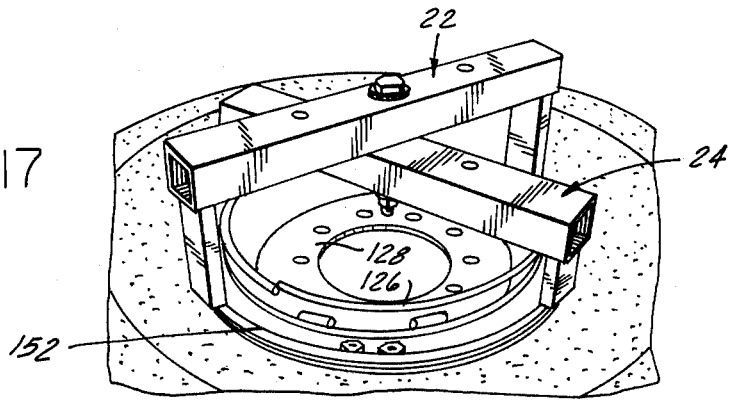

FIGS. 11 and 12 are top plan and side elevational views respectively of one of the four mounting plates which individually thread on the draw bolts of FIGS. 9 and 10.

FIGS. 13, 14, 15, 16 and 17 are reproductions of Polaroid snapshots illustrating one working embodiment of the tool of FIGS. 1 and 2 through 12 showing in perspective use of the tool with a multi-piece rim wheel and associated tubeless tire.

Figure 1:
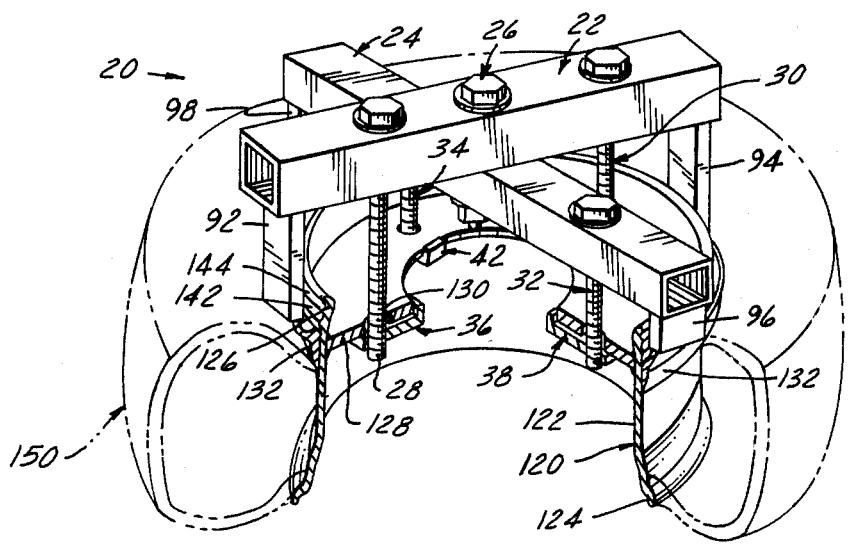
FIG. 1 is a simplified, semi-schematic perspective view of an exemplary but preferred embodiment of an improved tire mounting device of the present invention shown attached to a multi-piece wheel rim, the wheel rim being cut away to facilitate illustration as well as the associated tubeless tire (shown in phantom).

Referring in more detail to the accompanying drawings, and more particularly to FIGS. 1, 3 and 4, one preferred but exemplarly embodiment of an improved tire mounting tool 20 of the present invention is illustrated in assembled form and comprises the following parts and/or sub-assemblies:

An upper arm 22, a lower arm 24, arm connecting bolt 26 and associated nut 29, two upper arm hold down bolts 28 and 30, two lower arm hold down bolts 32 and 34, four mounting plates 36, 38, 40 and 42 and six washers 44, 46, 48, 50, 52 and 54.

In one working embodiment of tool 20 as illustrated in the drawings, upper and lower arms 22 and 24 each consist of equal lengths of hollow structural tubing 60 and 62 respectively which may for example be 3 inch by 3 inch square and 24.75 inches in length. Each of the arm tubes 60 and 62 is provided with an identical through-hole pattern consisting of a coaxially aligned pair of center holes 64 and 66 in the top and bottom walls 71 and 72 respectively of tube 60 and holes 68 and 70 through top and bottom walls 74 and 75 of tube 62. Upper arm 22 is disposed crosswise of lower arm 24 so as to rest with its bottom wall 72 upon the top wall 74 of tube 62 with holes 64, 66, 68 and 70 coaxially aligned, and the center connecting bolt 26, with washer 46 slipped thereon, is inserted downwardly through these holes to receive washer 54 and nut 29 to releasably secure the arms 22 and 24 in assembled relation. By loosening nut 29, the two arms may be pivoted relative to one another to vary their transverse relationship from the right angle relationship shown in FIGS. 1, 3 and 4. Each arm 22 and 24 also has two pair of coaxially aligned holes 76–78, 80–82, 84–86, 88–90 respectively in the top and bottom walls 71, 72 and 74, 75 spaced an equal distance apart from the respective center holes 64–66 and 68–70 of the associated arm. As shown in FIGS. 3 and 4, upper arm hole pairs 76–78 and 80–82 receive the upper arm hold down bolts 28 and 30 respectively, and likewise lower arm hole pairs 84–86 and 88–90 receive the lower arm hold down bolts 32 and 34 respectively.

Upper arm 22 has a pair of rectangular pusher plates 92 and 94 individually dependent from the opposite longitudinal ends of the arms which are welded to the bottom wall 72 of the arm so as to extend downwardly therefrom a predetermined distance, e.g., six inches in the illustrated working embodiment. Lower arm 24 also has a pair of rectangular pusher plates 96 and 98 likewise affixed by welding to the opposite longitudinal ends of the bottom wall 75 of tube 62 to depend therefrom a predetermined distance, e.g., three inches in the aforesaid working embodiment. The lower ends of pusher plates 92 and 94 are thus coplanar with the lower ends of plates 96 and 98 when arm 22 is mounted on arm 24, as shown in FIG. 3.

Each of the four mounting plates or blocks 36, 38, 40 and 42 are identical in construction, plate 36 being shown in FIGS. 11 and 12 on an enlarged scale over the other views. Each mounting plate 36 comprises a rectangular body 110 which, for example, may be 1 inch thick, 2 inches wide by 3 inches long, and has a threaded through-hole 112 adapted to threadably receive the associated hold down bolt 28-34 therethrough. A lip 114 protrudes upwardly (for example 0.6 inches) from the upper surface 116 of plate 36 at one longitudinal end thereof. Preferably lip 114 is provided with radiused corners 118, 120 (FIG. 11) along the side thereof facing hole 112 and is adapted to bear against the inner periphery 160 of the disc to prevent rotation of plate 36 when its associated bolt is being threaded in.

Figure 2:
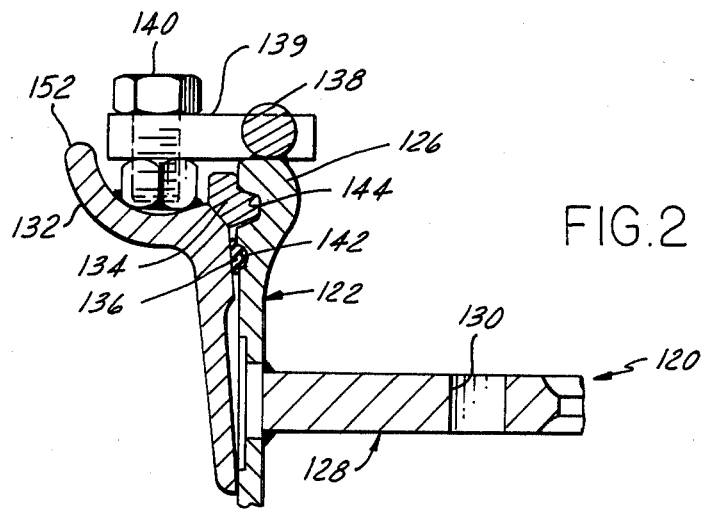
FIG. 2 is a fragmentary radial cross sectional view of a portion of the multi-piece wheel rim and associated hardware to facilitate understanding of the use of the tire mounting tool of the invention.

The operation and use of the tire mounting tool 20 of the present invention is best understood with reference to FIGS. 1, 2 and 13-17 of the drawings. Referring to FIG. 1, tool 20 is shown as installed on a so-called run-flat tire and wheel assembly which includes a wheel 120 having a multi-piece rim construction. Wheel 120 includes a main rim 122 with a bead retaining flange 124 integral with one side edge thereof and a gutter section 126 at the opposite axial edge thereof (FIG. 2). Wheel 120 also includes a wheel disc 128 in the form of a flat annulus welded at its outer periphery to the radially inner side of rim 122. Disc 128 is provided with a circular array of holes 130 for receiving wheel mounting bolts or like fasteners for mounting the wheel to an associated hub of a vehicle. The number of such mounting bolt holes will vary with the particular wheel designs of a various manufacturers, even for a common bolt hole circle diameter, and may in the type of wheel described consist of 8, 10 or 12 equally angularly spaced holes arranged on a given bolt circle diameter. Thus, in the wheel shown in FIGS. 13-17 there are ten such mounting bolt holes in the wheel disc spaced at equal angular increments of 36°.

Wheel 120 also includes a demountable tire bead retaining flange 132, sometimes referred to as a "bead seat ring", a circular split lock ring 134 and a sealing O-ring 136 (FIG. 2). Additionally, in the particular wheel shown in FIGS. 1 and 2, driver rods 138 are welded to the outer edge of gutter 126 which cooperates with a clamp plate 139 secured by a cap screw 140 to the demountable flange 132 to prevent relative rotation between rim 122 and flange 132, as set forth in more detail in U.S. Pat. No. 3,599,698. Rim 122 has external circular grooves 142 and 144 for receiving O-ring 136 and lock 134 respectively.

To mount a tire 150 on wheel 120 using tool 20 of the invention, the following steps are preferably performed (usual lubrication steps omitted for brevity):

1. Place tire 150 on wheel 120 (gutter side 126 up) using standard procedures.

2. Place bead retaining flange 132 on wheel 120.

3. Place lower arm 24 of mounting tool 20 on flange 132 such that the lower ends of pusher plates 96 and 98 rest on the outer edge 152 of flange 132.

4. Line up holes 84–86 and 88–90 in arm 24 with a diametrically-opposed pair of bolt holes 130 in wheel disc 128, and then insert hold down bolts 32 and 34 downwardly through these aligned arm and disc holes.

5. Attach mounting plates or blocks 38 and 42 to bolts 32 and 34 respectively and snug up blocks 38 and 42 even with the underside of wheel disc 128 by rotating the associated hold down bolts while orienting Lip 114 to engage rim inner diameter lip 160 to prevent rotation of blocks 38–42.

6. Bolt upper arm 22 of the mounting tool 20 to the lower arm 24 at whatever angle is closest to 90° and which also lines up the holes 76–78 and 80–82 in the upper arm 22 with another pair of diametrically-opposed holes 130 in wheel disc 128.

7. Insert hold down bolts 28 and 30 downwardly through the holes 76–78 and 80–82 of the arm 22 and the aligned wheel bolt holes 130. Then attach the mounting blocks 36 and 40 to bolts 28 and 30 respectively, and snug up the same even with the underside of wheel disc by rotating the associated hold down bolts.

8. Using a crossing pattern, manually tighten the bolts 28, 30, 32 and 34 until the demountable flange 132 has been pushed below O-ring and lock ring grooves 144 and 142 on wheel rim 122.

9. Assemble O-ring 136 and lock ring 134 into their respective rim grooves.

10. Loosen bolts 28, 30, 32 and 34, again in a crossing pattern, to permit flange 132 to move upwardly over O-ring 136 and to then engage lock ring 134. When satisfied that the assembly is proper and aligned, remove mounting blocks 36, 38, 40 and 42 from their associated hold down bolts.

11. Loosen and remove connecting bolt 26 and nut 29 holding the arms 22 and 24 together and remove both arms from the wheel assembly.

12. Place wheel and tire in a safety cage or use safety chains, and then inflate tire, being careful to observe standard safety precautions, e.g., stand to the side during the inflation, etc.

Referring to FIGS. 13–17, which photographically illustrate the use of tool 20 in the above described tire mounting procedure, note that, in accordance with one of the features of the invention, upper arm 22 may be oriented to swing on lower arm 24 to any selected angle, preferably that most closely approaching a 90° angle with lower arm 24 to align the upper arm hold down bolts 28 and 30 with a diametrically-opposed pair of wheel disc bolt holes 130. Tool 20 thus can readily accommodate various bolt hole patterns of odd or even number in addition to bolt hole patterns providing 15° increments or multiples thereof (i.e., 4, 8 and 12 hole patterns) so long as the pattern has at least one, and preferably two, diametrically opposed pairs of bolt holes. In addition it will be noted that tool 20 in operation and use does not engage or touch the tire 150, which, in turn, prevents marking or defacing of the tire. Instead the tool is dimensioned to rest on the edge 152 of demountable flange 132, and the hold down bolts 28–34 and associated blocks 36–42 maintain this engagement. Tool 20 also provides relatively even force distribution around the circumference of the demountable flange 132 and thus helps eliminate wedging or cocking of the flange when compressing tire 150 to install the O-ring 136 and the lock ring 134.

Due to the sequence of individually tightening or loosening, in the aforementioned crossing pattern, the four hold down bolts, tool 20 in operation insures slow engagement of the demountable flange 132 to the O-ring 136 and lock ring 134 interface during the release operation of tool 20, thereby assisting visual inspection of proper fit and placement of the wheel and tire assembly components. If the resistance forces of tire 150 are great enough to cause the tire bead to climb the 5° rim taper prior to pressurization of the tire, tool 20 also is useful in assisting in seating of the tire bead on the demountable flange 132.

It is also to be understood that, for some designs of wheel and tire assemblies, tool 20 can be operated using only the upper arm hold down bolts 28 and 30 because the arms 22 and 24 are rigid enough in most cases to allow upper arm 22 to press down on lower arm 24 without undue deflection of the arms. When tool 20 is used in this modified manner the steps of installing and tightening the lower arm hold down bolts 32 and 34 and associated mounting plates or blocks 36 and 40, as well as removal of the same, are eliminated, thereby shortening the mounting procedure. This modified procedure also enables lower arm 24 to be oriented at right angles to upper arm 22 regardless of wheel bolt hole pattern.

From the foregoing description it will now be apparent that the tire mounting and dismounting tool of the present invention amply fulfills the aforestated objects. In addition, since the tool is relatively lightweight and readily assembled and disassembled, and consists of only a few parts, the same can be stored in a small tool box for added convenience, security and portability. Although it is to be understood that the primary use of the present invention as presently envisioned is as a mounting assist tool, tool 20 is very versatile and clearly finds application in the demounting process, especially in those cases where rust has accummulated between the demountable flange 132 and the wheel rim so as to require uniformly large pressures for breaking down the tire. Obviously, numerous modifications and variations of the present invention are possible in light of the above teachings. It is therefore to be understood that within the scope of the appended claims the invention may be practiced otherwise than as specifically described herein.

I claim:

1. A tool for mounting and demounting of large tires from associated multi-piece wheel rims including in combination: a lower arm having a length adapted to span the diameter of a demountable tire retaining flange of the wheel rim while oriented perpendicular to the axis of the wheel and tire assembly, said lower arm having pusher plates dependent therefrom adapted to engage the outer periphery of the tire bead retaining flange, an upper arm also adapted to span the diameter of said flange and to rest upon said lower arm with its longitudinal axis extending transversely of the longitudinal axis of the lower arm, said upper arm having a pair of pusher plates dependent therefrom adapted to seat on the outer periphery of said flange with said upper arm resting on said lower arm, means interconnecting said upper and lower arms so that the same can pivot relative to one another about the axis of the wheel assembly, said connecting means being operable to fix the upper and lower arms rigidly in a given transverse crossing orientation, a first pair of hold down bolts carried on said upper arm one on either side of said arm interconnecting means and being spaced from one another to correspond with the diameter of the wheel disc mounting bolt hole pattern for insertion of said bolts through a diametrically-opposed pair of wheel mounting bolt holes, and a pair of mounting plates threadably received individually one on each of said first hold down bolts adapted to engage the underside of the wheel disc upon tightening of the associated hold down bolt.

2. The combination as set forth in claim 1 wherein said arm interconnecting means comprises a bolt extending through coaxially aligned centrally located holes in said upper and lower arms to provide a pivot post for the arms and nut means threadable thereon to releasably fix said arms in said given orientation relative to one another.

3. The combination as set forth in claim 2 wherein said mounting plates each have an ear extending upwardly therefrom adapted to overlap the radially inner peripheral edge of said wheel disc when in abutted relation with the wheel disc and operably engaged with the associated hold down bolts.

4. The combination as set forth in claim 3 further including a second pair of hold down bolts carried on said lower arm on either side of said arm interconnecting means and spaced from one another to correspond to the diameter of the wheel disc mounting bolt hole pattern, and a pair of second mounting plates threadably received individually one on each of said second hold down bolts adapted to engage the underside of said wheel disc upon tightening of said second hold down bolts, said second plates being identical to said first-mentioned plates.

5. The combination as set forth in claim 4 wherein each of said arms comprises a hollow tubular member fabricated from square structural tubing.

6. The combination as set forth in claim 5 wherein all of said bolts are removable from said arms for disassembly of said tool into a compact array storable in a portable tool box wherein said arms and bolts are stored with their longitudinal axes generally parallel.

* * * * *